Jan. 22, 1929.

E. J. RATHBUN 1,700,074

BLOCK AND FALL SHEAVE

Filed March 21, 1928

Witnesses:

Inventor

Elmer J. Rathbun

By Victor J. Evans

Attorney

Patented Jan. 22, 1929.

1,700,074

UNITED STATES PATENT OFFICE.

ELMER J. RATHBUN, OF NARRAGANSETT, RHODE ISLAND.

BLOCK AND FALL SHEAVE.

Application filed March 21, 1928. Serial No. 263,537.

The present invention relates to pulleys and more particularly to the type known as block and fall sheaves which are used particularly on all kinds of sailing vessels and on steamers for hoisting and lowering heavy loads, such as steam launches and life boats.

Features of my device are the provision of pulley wheels which are self-lubricating and an object of the invention is to facilitate the self-lubrication of said pulleys and the antifriction rollers contained therein.

Other objects are simplicity, economy and strength in the construction of the device, cheapness in manufacture and the elimination of the possibility of jamming of the device.

In the drawing:—

Figure 1:
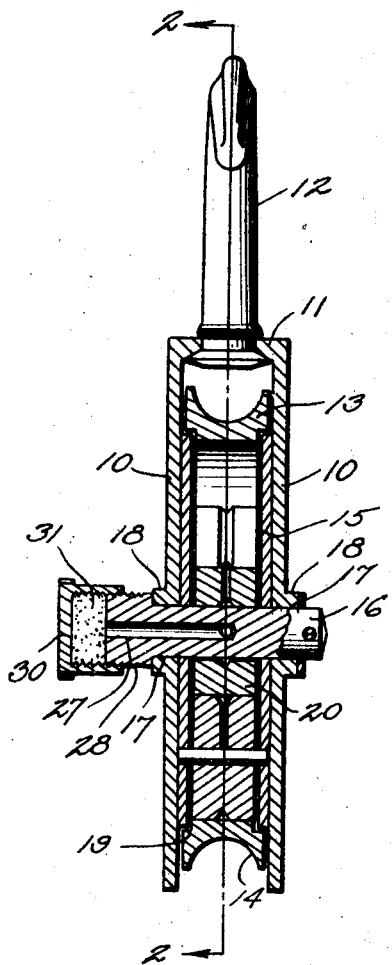
Figure 1 is a section on the line 1—1 of Figure 2, showing the relation of the various parts in my invention.
Figure 2:
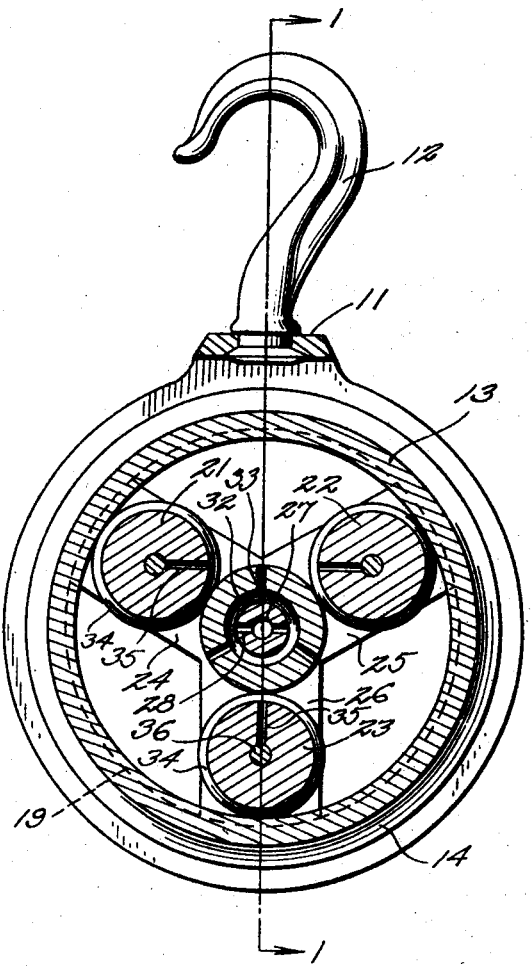
Figure 2 is a sectional view at right angles to that shown in Figure 1 and on the line 2—2 of Figure 1, showing further the relation of the parts.

Referring to the drawing in detail, 10 designates the side plates of the block secured together at their upper end by cross member 11 into which is swivelled the hook 12. Lying between the side members 10 and rotatably secured thereto is a pulley 13 comprising a grooved annular rim member 14 and side arbors 15 mounted on a pin 16 extending transversely of the device and being journaled in the side plates 10 which are provided with apertures 17 having outwardly projecting flanges 18 surrounding the same. The rim 14 is provided with annular shoulders 19 into which the ends of the arbors 15 fit. Rotatably secured on the pin 16 is a roller 20, the periphery of which is in frictional contact with rollers 21, 22 and 23, rotatably mounted on pins 36 extending through the arms 24, 25 and 26 of the arbors 15, said rollers 21, 22 and 23 being also in frictional contact with the inner periphery of the annular rim 14. The pin 16 is provided with a central bore 27 extending from one end to about half way the length thereof at which point there are provided ducts 28 forming communication between said bore and the periphery of the pin. A portion of the end of the pin containing the bore 27 is provided with screw threads 29 upon its periphery upon which a cap 30 may be threaded, said cap being adapted to contain a lubricant 31 which may be forced by screwing the cap further on the pin through the bore 27 and out through the ducts 28 into a groove 32 formed in the inner surface of the roller 20 and from this groove extend ducts 33 formed radially therein to the periphery of the roller. The rollers 21, 22 and 23 are likewise provided with annular grooves 34 from which radial ducts 35 extend through the center of the rollers for carrying lubricant to the pins 36.

From the above description it will appear that I have provided for the lubrication of the journaling of all of the rollers of a pulley of this character and for the lubrication of the contacting surfaces between the rollers 21, 22 and 23 and the peripheral rim 14.

With a device of this kind there is no chance of jamming and the work of hoisting heavy articles is facilitated.

Having described my invention, what I claim is:—

In a device of the character described, a block having side members, a hook for said block, a pin extending transversely of said block, a central roller rotatably mounted on said pin, arbors on said pin and extending radially therefrom, outlying rollers mounted on said arbors and having their peripheries in frictional contact with the periphery of the first named roller, an annular rim formed with an annular groove on its outer surface and having its inner surface contacting with the outlying rollers, said pin having a central bore with radial ducts extending therefrom through the periphery of the pin, said central roller having an annular groove on its inner periphery and ducts leading therefrom, said outlying rollers having annular grooves on their outer periphery, and said outlying rollers having ducts leading to the centers thereof.

In testimony whereof I affix my signature.

ELMER J. RATHBUN.